US012461208B2

(12) United States Patent
Wang et al.

(10) Patent No.: US 12,461,208 B2
(45) Date of Patent: Nov. 4, 2025

(54) DIFFRACTIVE LIGHT DISTRIBUTION FOR PHOTOSENSOR ARRAY-BASED LIDAR RECEIVING SYSTEM

(71) Applicant: BEIJING VOYAGER TECHNOLOGY CO., LTD., Beijing (CN)

(72) Inventors: Youmin Wang, Berkeley, CA (US); Yue Lu, Los Gatos, CA (US)

(73) Assignee: BEIJING VOYAGER TECHNOLOGY CO., LTD., Beijing (CN)

( * ) Notice: Subject to any disclaimer, the term of this patent is extended or adjusted under 35 U.S.C. 154(b) by 1002 days.

(21) Appl. No.: 17/544,920

(22) Filed: Dec. 7, 2021

(65) Prior Publication Data

US 2023/0176197 A1 Jun. 8, 2023

(51) Int. Cl.
*G01S 7/481* (2006.01)
*G01B 11/22* (2006.01)
*G01S 17/89* (2020.01)

(52) U.S. Cl.
CPC ............ *G01S 7/4817* (2013.01); *G01B 11/22* (2013.01); *G01S 7/4814* (2013.01); *G01S 7/4816* (2013.01); *G01S 17/89* (2013.01)

(58) Field of Classification Search
CPC .............................. G02B 5/0284; G01S 7/481
See application file for complete search history.

(56) References Cited

U.S. PATENT DOCUMENTS

| 6,259,561 B1* | 7/2001 | George | G02B 27/425 |
| | | | 359/569 |
| 2015/0268630 A1* | 9/2015 | Azzazy | G02B 27/0944 |
| | | | 359/11 |
| 2018/0329065 A1* | 11/2018 | Pacala | G01S 17/42 |

* cited by examiner

*Primary Examiner* — Robert W Hodge
*Assistant Examiner* — Clara G Chilton
(74) *Attorney, Agent, or Firm* — BAYES PLLC

(57) ABSTRACT

Embodiments of the disclosure provide an optical sensing system containing a diffractive optical element, and an optical sensing method using the same. For example, the optical sensing system includes a laser emitter configured to emit an optical signal. The optical sensing system further includes a steering device configured to direct the emitted optical signal toward an environment surrounding the optical sensing system. The optical sensing system additionally includes a diffractive optical element configured to diffract the optical signal returning from the environment to form a plurality of beams focusing at a plurality of spots on a focal plane. The optical sensing system additionally includes a photosensor array placed at the focal plane, configured to detect the plurality of beams diffracted by the diffractive optical element at the plurality of spots, wherein the photosensor array comprises a plurality of sensitive elements.

16 Claims, 8 Drawing Sheets

DIFFRACTIVE LIGHT DISTRIBUTION FOR PHOTOSENSOR ARRAY-BASED LIDAR RECEIVING SYSTEM

TECHNICAL FIELD

The present disclosure relates to a light detection and ranging (LiDAR) system, and more particularly, to a diffractive optical element for light redistribution in a photosensor array-based LiDAR system.

BACKGROUND

In a LiDAR system, the size of a laser beam determines the imaging resolution. A decreased laser beam size may result in an increased imaging resolution. However, the size of an emitted laser beam cannot always decrease, and thus there is a size limitation of an emitted laser beam. A photosensor array in a receiving end of a LiDAR system may allow sub-pixelization to be achieved, to increase the imaging resolution. In such a LiDAR system, one returning laser beam may be detected by multiple sensitive elements in the photosensor array, to achieve an increased image resolution.

However, in existing LiDAR systems containing a photosensor array, a returning light beam is not uniformly distributed. That is, in different sections covered by sensitive elements in a photosensor array, the detected light beams may have different intensities. One possible reason is that the emitted laser beam itself is not uniformly distributed. Another reason is the Lambertian effect that is inherent in light reflection when laser beams are reflected from the objects in the environment. According to the Lambertian effect, a reflected laser beam may have a higher intensity in one direction (e.g., when the incident angle is 0 degree) than another direction (e.g., when the incident angle is large). The non-uniform distribution of the reflected laser beam could result in an optical loss in certain channels of a photosensor array, and thus distorted imaging or mapping may occur in sub-pixelization. In addition, due to the fabrication limitation, there are certain non-sensitive areas or gaps between sensitive areas of sensitive elements included in a photosensor array. Certain portion(s) of a returning laser beam may thus fall in the gaps between the sensitive areas of the sensitive elements, resulting in additional optical loss, which further worsens the performance of an existing LiDAR system containing a photosensor array.

Embodiments of the disclosure address the above problems by including a diffractive optical element in the receiving end of a LiDAR system, to split a laser beam returning from the environment into multiple laser beams with a more uniform light intensity distribution.

SUMMARY

Embodiments of the disclosure provide an exemplary optical sensing system. The optical sensing system includes a laser emitter configured to emit an optical signal. The optical sensing system further includes a steering device configured to direct the emitted optical signal toward an environment surrounding the optical sensing system. The optical sensing system additionally includes a diffractive optical element configured to diffract the optical signal returning from the environment to form a plurality of beams focusing at a plurality of spots on a focal plane. The optical sensing system additionally includes a photosensor array placed at the focal plane and configured to detect the plurality of beams diffracted by the diffractive optical element at the plurality of spots, where the photosensor array includes a plurality of sensitive elements.

Embodiments of the disclosure further provide an exemplary optical sensing method. The optical sensing method includes emitting, by a laser emitter of an optical sensing system, an optical signal toward an environment surrounding the optical sensing system. The optical sensing method further includes directing, by a steering device of the optical sensing system, the emitted optical signal toward the environment surrounding the optical sensing system. The optical sensing method additionally includes diffracting, by a diffractive optical element of the optical sensing system, the optical signal returning from the environment to form a plurality of beams focusing at a plurality of spots on a focal plane. The optical sensing method additionally includes detecting, by a photosensor array of the optical sensing system, the plurality of beams diffracted by the diffractive optical element at the plurality of spots, where the photosensor array includes a plurality of sensitive elements.

Embodiments of the disclosure additionally provide an exemplary receiver for an optical sensing system. The receiver includes a diffractive optical element configured to diffract an optical signal returning from an environment surrounding the optical sensing system, to form a plurality of beams focusing at a plurality of spots on a focal plane, where the optical signal is emitted and directed toward the environment by a transmitter of the optical sensing system. The receiver further includes a receiving lens configured to focus the plurality of beams at the plurality of spots on the focal plane. The receiver additionally includes a photosensor array configured to detect the plurality of beams diffracted by the diffractive optical element at the plurality of spots, where the photosensor array includes a plurality of sensitive elements.

It is to be understood that both the foregoing general description and the following detailed description are exemplary and explanatory only and are not restrictive of the present disclosure, as claimed.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

Embodiments of the present disclosure provide a diffractive optical element (which may be also referred to as "beam splitter") in the receiving end of a LiDAR system. According to one example, the diffractive optical element may be disposed before a receiving lens of the receiver of a LiDAR system. The diffractive optical element may include a microstructure (e.g., a periodic grating structure) on the surface. The microstructure may split an incident laser beam returning from the environment into multiple laser beams with certain intervals, intensity ratios, and a symmetrical distribution. Through the proper configuration of the microstructure on the diffractive optical element, the internals between the split laser beams may be controlled to minimize or avoid optical signals falling in gaps between the sensitive areas of the sensitive elements included in a photosensor array in the receiver. In addition, the intensity ratios between the split laser beams may be controlled to be close to 1 or to be equal to 1, so that the split laser beams collectively have a more uniform intensity distribution when detected by the multiple sensitive elements included in the photosensor array.

In other words, by introducing a diffractive optical element in the receiving end, the disclosed LiDAR system may compensate for the nonuniformity of a returned optical signal caused by the Lambertian effect or by the emitted laser beams themselves. In addition, the intervals between the split laser beams may be controlled by properly configuring the microstructure of the diffractive optical element, to allow the optical signals falling in the gaps between the sensitive areas of the sensitive elements to be minimized or no optical signal falling in the gaps between the sensitive areas. Accordingly, the returned optical signal detected by the sensitive elements of the photosensor array becomes more uniform and more focused on the sensitive areas of the photosensor array. The pixel/signal loss may be thus prevented, and imaging/mapping distortion may be minimized, resulting in an improved quality of an obtained image or map. The features and advantages described herein are not all-inclusive and many additional features and advantages will be apparent to one of ordinary skill in the art in view of the figures and the following descriptions.

The disclosed LiDAR system containing a diffractive optical element can be used in many applications. For example, the disclosed LiDAR system can be used in advanced navigation technologies, such as to aid autonomous driving or to generate high-definition maps, in which the optical sensing system can be equipped on a vehicle.

Figure 1:
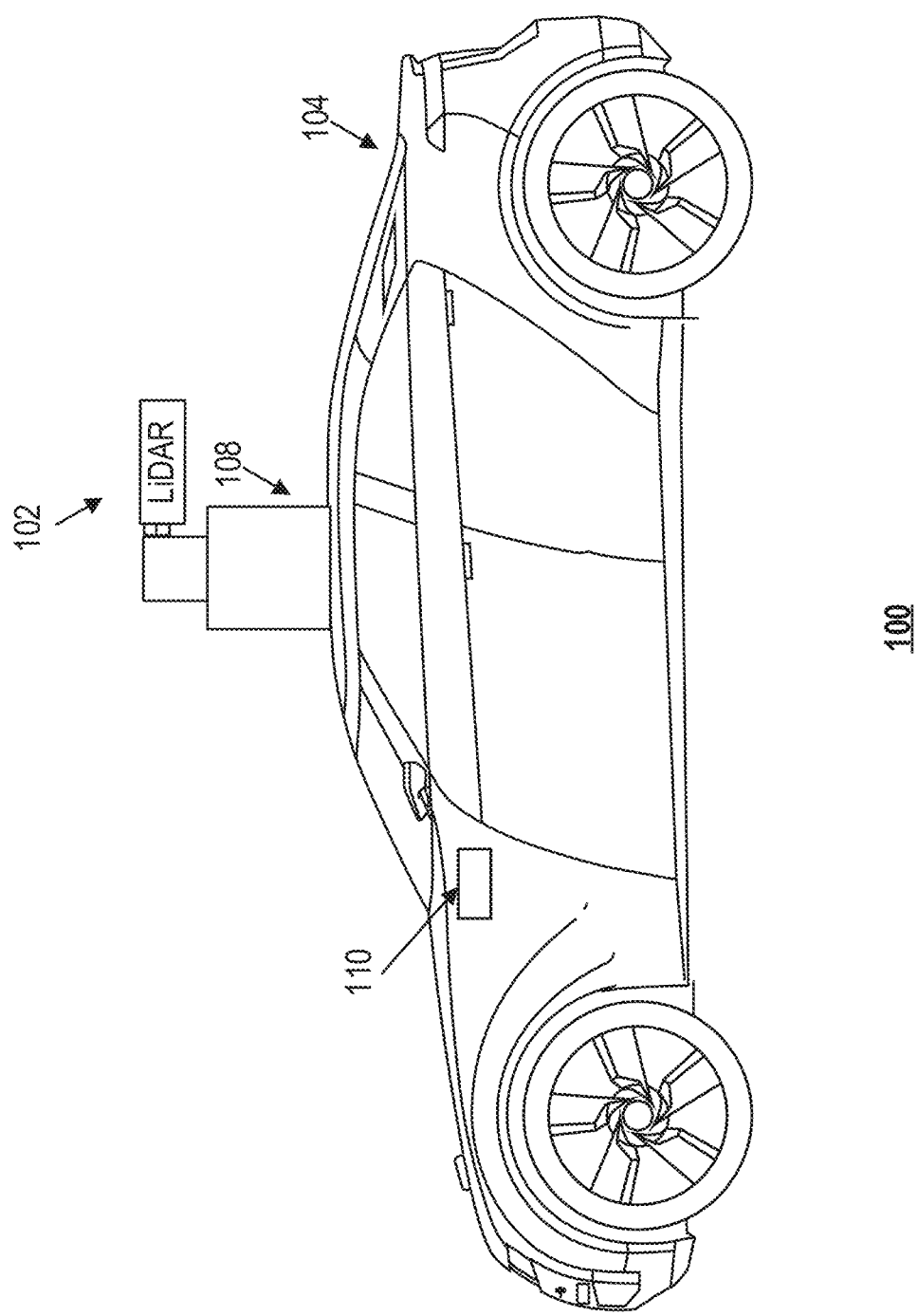
FIG. 1 illustrates a schematic diagram of an exemplary vehicle equipped with a LiDAR system containing a diffractive optical element, according to embodiments of the disclosure.

FIG. 1 illustrates a schematic diagram of an exemplary vehicle equipped with an optical sensing system containing a diffractive optical element, according to embodiments of the disclosure. Consistent with some embodiments, vehicle 100 may be a survey vehicle configured for acquiring data for constructing a high-definition map or 3-D buildings and city modeling. Vehicle 100 may also be an autonomous driving vehicle.

As illustrated in FIG. 1, vehicle 100 may be equipped with an optical sensing system, e.g., a LiDAR system 102 (also referred to as "LiDAR system 102" hereinafter) mounted to a body 104 via a mounting structure 108. Mounting structure 108 may be an electro-mechanical device installed or otherwise attached to body 104 of vehicle 100. In some embodiments of the present disclosure, mounting structure 108 may use screws, adhesives, or another mounting mechanism. Vehicle 100 may be additionally equipped with a sensor 110 inside or outside body 104 using any suitable mounting mechanisms. Sensor 110 may include sensors used in a navigation unit, such as a Global Positioning System (GPS) receiver and one or more Inertial Measurement Unit (IMU) sensors. It is contemplated that the manners in which LiDAR system 102 or sensor 110 can be equipped on vehicle 100 are not limited by the example shown in FIG. 1 and may be modified depending on the types of LiDAR system 102 and sensor 110 and/or vehicle 100 to achieve desirable 3D sensing performance.

Consistent with some embodiments, LiDAR system 102 and sensor 110 may be configured to capture data as vehicle 100 moves along a trajectory. For example, a scanning system of LiDAR system 102 may be configured to scan the surrounding environment. LiDAR system 102 measures distance to a target by illuminating the target with laser beams and measuring the reflected/scattered pulses with a receiver. The laser beams used for LiDAR system 102 may be ultraviolet, visible, or near-infrared, and may be pulsed or continuous wave laser beams. In some embodiments of the present disclosure, LiDAR system 102 may capture point clouds including depth information of the objects in the surrounding environment, which may be used for constructing a high-definition map or 3-D buildings and city modeling. As vehicle 100 moves along the trajectory, LiDAR system 102 may continuously capture data including the depth information of the surrounding objects (such as moving vehicles, buildings, road signs, pedestrians, etc.) for map, building, or city modeling construction.

Figure 2:
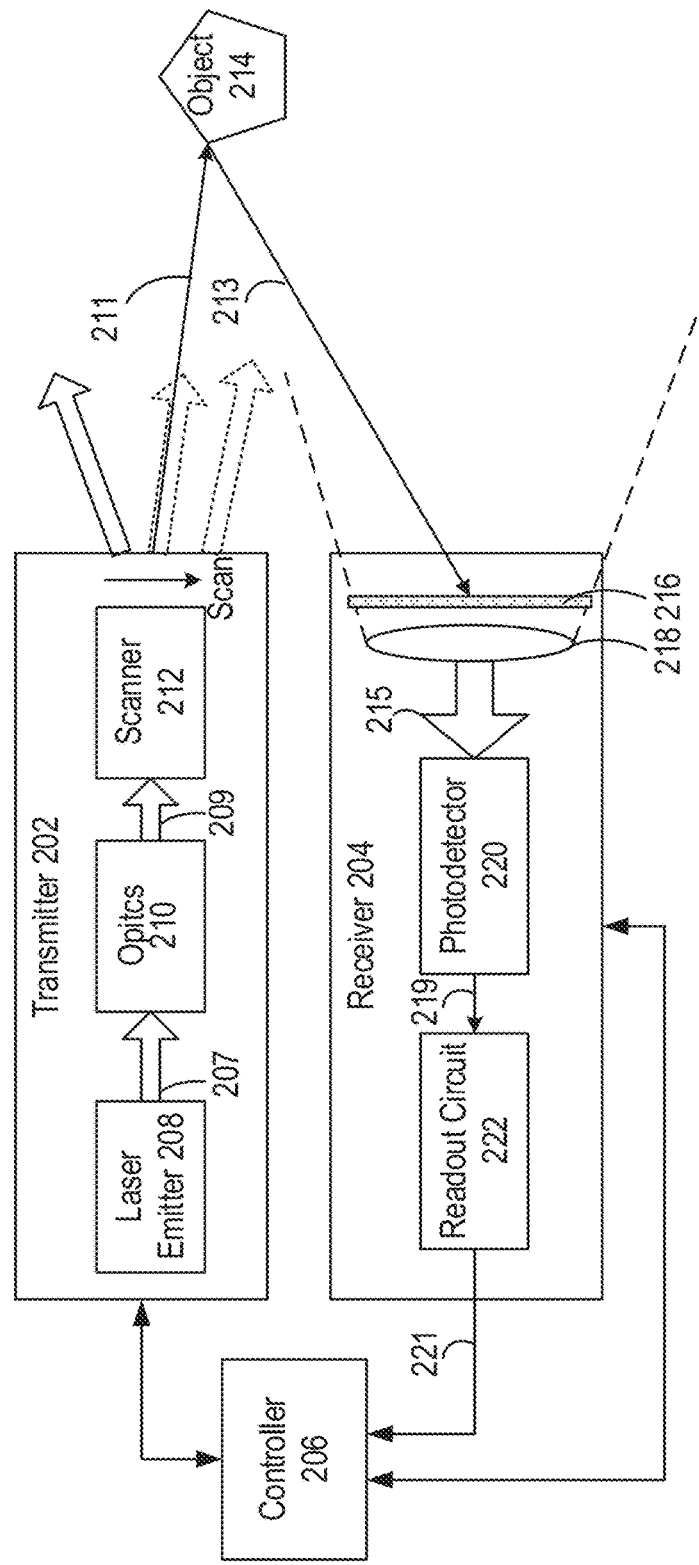
FIG. 2 illustrates a block diagram of an exemplary LiDAR system containing a diffractive optical element, according to embodiments of the disclosure.

FIG. 2 illustrates a block diagram of an exemplary LiDAR system containing a diffractive optical element, according to embodiments of the disclosure. In some embodiments, LiDAR system 102 may be a scanning flash LiDAR, a semi-coaxial LiDAR, a coaxial LiDAR, etc. As illustrated, LiDAR system 102 may include a transmitter 202, a receiver 204, and a controller 206 coupled to transmitter 202 and receiver 204. Transmitter 202 may further include a laser emitter 208 for emitting an optical signal and optics 210 for collimating optical signal emitted by laser emitter 208. In some embodiments, transmitter 202 may additionally include a scanner 212 (or steering device 212) for steering the collimated optical signal according to a certain pattern. Transmitter 202 may emit optical beams (e.g., pulsed laser beams, continuous wave (CW) beams, frequency modulated continuous wave (FMCW) beams) along multiple directions. Receiver 204 may further include a diffractive optical element 216, a receiving lens 218, a photodetector 220, and a readout circuit 222.

Laser emitter 208 may be configured to emit laser beams 207 (also referred to as "native laser beams") to optics 210. For instance, laser emitter 208 may generate laser beams in the ultraviolet, visible, or near-infrared wavelength range, and provide the generated laser beams to optics 210. In some embodiments of the disclosure, depending on underlying laser technology used for generating laser beams, laser emitter 208 may include one or more of a double heterostructure (DH) laser emitter, a quantum well laser emitter, a quantum cascade laser emitter, an interband cascade (ICL)

laser emitter, a separate confinement heterostructure (SCH) laser emitter, a distributed Bragg reflector (DBR) laser emitter, a distributed feedback (DFB) laser emitter, a vertical-cavity surface-emitting laser (VCSEL) emitter, a vertical-external-cavity surface-emitting laser (VECSEL) emitter, an extern-cavity diode laser emitter, etc., or any combination thereof. Depending on the number of laser emitting units in a package, laser emitter 208 may include a single emitter containing a single light-emitting unit, a multi-emitter unit containing multiple single emitters packaged in a single chip, an emitter array or laser diode bar containing multiple (e.g., 10, 20, 30, 40, 50, etc.) single emitters in a single substrate, an emitter stack containing multiple laser diode bars or emitter arrays vertically and/or horizontally built up in a single package, etc., or any combination thereof. Depending on the operating time, laser emitter 208 may include one or more of a pulsed laser diode (PLD), a CW laser diode, a Quasi-CW laser diode, etc., or any combination thereof. Depending on the semiconductor materials of diodes in laser emitter 208, the wavelength of incident laser beams 207 may be at different values, such as 760 nm, 785 nm, 808 nm, 848 nm, 870 nm, 905 nm, 940 nm, 980 nm, 1064 nm, 1083 nm, 1310 nm, 1370 nm, 1480 nm, 1512 nm, 1550 nm, 1625 nm, 1654 nm, 1877 nm, 1940 nm, 2000 nm, etc. It is understood that any suitable laser source may be used as laser emitter 208 for emitting laser beams 207 at a proper wavelength.

Optics 210 may include one or more optics that are configured to shape a laser beam and collimate the laser beam into a narrow laser beam 209 to increase the scanning resolution and the range to scan object(s) 214. Scanner 212 may include various optical elements such as prisms, mirrors, gratings, optical phased array (e.g., liquid crystal-controlled grating), or any combination thereof. In some embodiments, object(s) 214 may be made of a wide range of materials including, for example, non-metallic objects, rocks, rain, chemical compounds, aerosols, clouds, and even single molecules. In some embodiments, at each time point during the scan, a scanner may emit laser beams 211 to object 214 in a direction within a range of scanning angles by rotating a deflector, such as a micromachined mirror assembly.

Receiver 204 may be configured to detect returned laser beams 213 returned from object 214. Upon contact, laser beams can be reflected/scattered by object 214 via backscattering, such as Raman scattering, and fluorescence. Returned laser beams 213 may be in a same or different direction from laser beams 211. In some embodiments, receiver 204 may collect laser beams returned from object 214 and output signals reflecting the intensity of the returned laser beams.

As illustrated in FIG. 2, receiver 204 may include a diffractive optical element 216, a receiving lens 218, a photodetector 220, and a readout circuit 222. Diffractive optical element 216 may split laser beams returned from the environment. For instance, diffractive optical element 216 may split each returned laser beam into multiple laser beams with predefined intervals in between, intensity ratios, and a symmetrical distribution. Receiving lens 218 may be configured to converge and focus the split laser beams on photodetector 220 as focused spots 215. Photodetector 220 may be placed at the focal plane of diffractive optical element 216 where the focused spots 215 are focused on.

Photodetector 220 may be configured to detect the focused spots 215 corresponding to split laser beams. In some embodiments, photodetector 220 may be a photosensor array that includes multiple sensitive elements. Each focused laser spot 215 may be detected by one or more sensitive elements included in the photosensor array and be converted into an electrical signal 219 (e.g., a current or a voltage signal). Electrical signal 219 may be an analog signal which is generated when photons are absorbed in a photodiode included in photodetector 220. In some embodiments, a sensitive element included in photodetector 220 may be a PIN detector, an avalanche photodiode (APD) detector, a single photon avalanche diode (SPAD) detector, a silicon photo multiplier (SiPM) detector, or the like. In some embodiments, the photosensor array may be arranged in a one-dimensional or two-dimensional array.

Readout circuit 222 may be configured to integrate, amplify, filter, and/or multiplex signal detected by photodetector 220 and transfer the integrated, amplified, filtered, and/or multiplexed signal 221 onto an output port (e.g., controller 206) for readout. In some embodiments, readout circuit 222 may act as an interface between photodetector 220 and a signal processing unit (e.g., controller 206). Depending on the configurations, readout circuit 222 may include one or more of a transimpedance amplifier (TIA), an analog-to-digital converter (ADC), a time-to-digital converter (TDC), or the like.

Controller 206 may be configured to control transmitter 202 and/or receiver 204 to perform detection/sensing operations. For instance, controller 206 may control laser emitter 208 to emit laser beams 207, or control photodetector 220 to detect optical signal returning from the environment. In some embodiments, controller 206 may also control data acquisition and perform data analysis. For instance, controller 206 may collect digitalized signal information from readout circuit 222, determine the distance of object 214 from LiDAR system 102 according to the travel time of laser beams, and construct a high-definition map or 3-D buildings and city modeling surrounding LiDAR system 102 based on the distance information of object(s) 214. In some embodiments, controller 206 may combine the digitalized signals from multiple split laser beams corresponding to one returning laser beam in constructing a high-definition map or 3-D buildings and city modeling surrounding LiDAR system 102. The specific details regarding the splitting of a returning laser beam by a diffractive optical element will be described hereinafter in conjunction with FIGS. 3-8.

Figure 3:
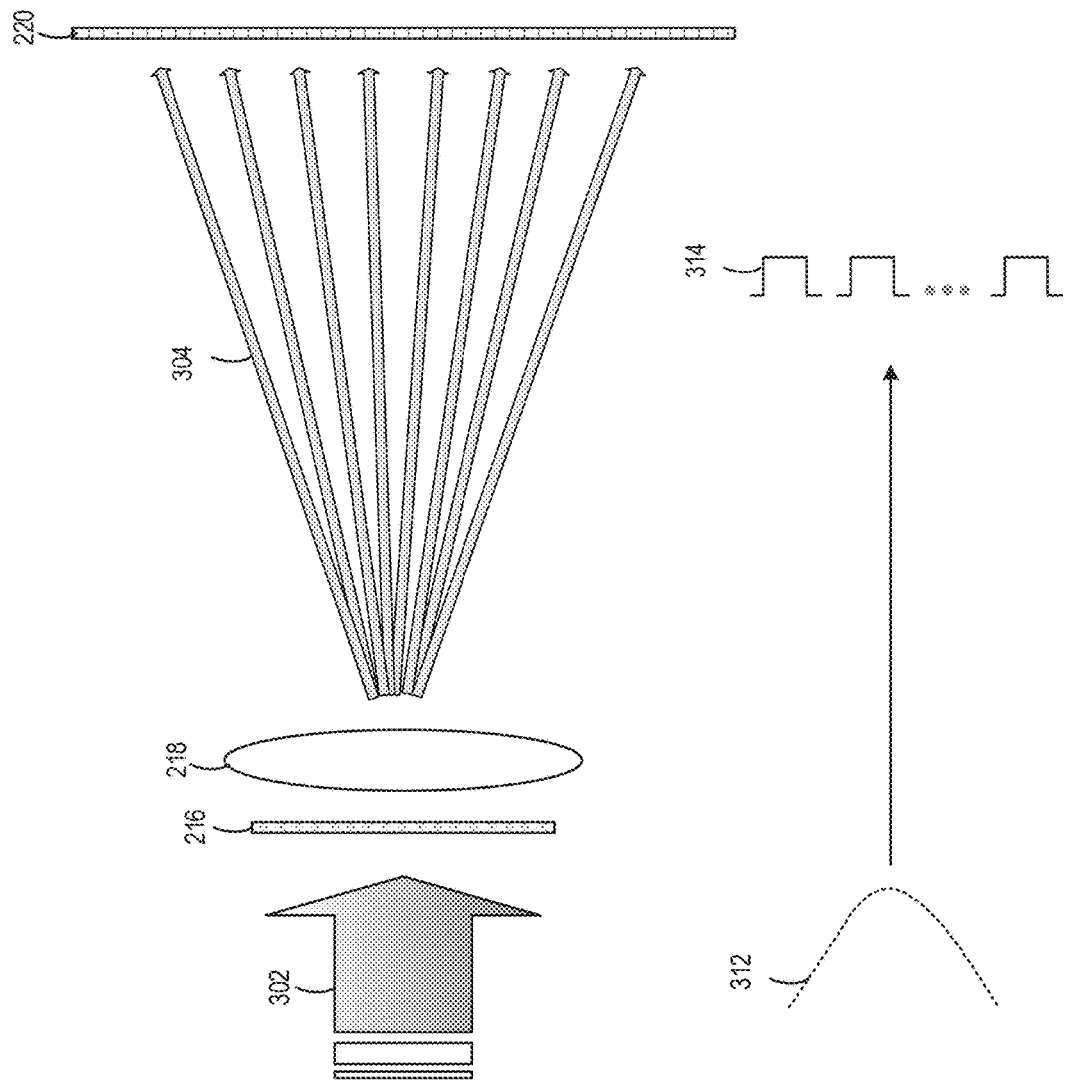
FIG. 3 illustrates a schematic diagram of an exemplary splitting of a laser beam returning from an environment, according to embodiments of the disclosure.

FIG. 3 illustrates a schematic diagram of exemplary diffraction of a laser beam by a diffractive optical element, according to embodiments of the disclosure. As illustrated, a laser beam 302 may be directed toward a diffractive optical element 216. The laser beam 302 may be a laser beam reflected from the environment during an optical sensing process by an optical sensing system (e.g., LiDAR system 102). When laser beam 302 passes through diffractive optical element 216, the laser beam may be split into a plurality of laser beams. For instance, after passing through diffractive optical element 216, laser beam 302 may be split into eight laser beams 304, as illustrated in FIG. 3. In some embodiments, the split laser beams may be non-overlapping beams that have certain gaps or intervals between the split laser beams.

In some embodiments, the intervals, intensity ratios, and symmetrical distribution of split beams 304 may be freely configurable. That is, a laser beam transmitted by diffractive optical element 216 may be reshaped to almost any desired distribution by adjusting diffraction and the subsequent propagation. Meanwhile, the divergence angle, diameter, and polarization of the incident laser beam may remain unchanged after beam splitting. That is, diffractive optical element 216 may only change the intensity pattern for the split beams, but maintain other attributes of an incident laser beam (e.g., beam size, divergence, polarization). This may be due to that a diffractive optical element does not have sub-apertures that clip a laser beam, unlike prisms and other refractive methods for producing a beam splitter.

In some embodiments, the freely configurable intervals, intensity ratios, and symmetrical distribution of split laser beams 304 may be set by the periodic microstructure of diffractive optical element 216. For instance, the periodic microstructure of diffractive optical element 216 may be optimized to provide a certain splitting angle at the design wavelength, with maximal efficiency. In addition, since the microstructure of diffractive optical element 216 is periodic, diffractive optical element 216 may be not sensitive to the concentration of a laser beam or the beam size. In other words, the splitting angle of the split laser beams will be determined only by the microstructure design and the laser wavelength. Specific details regarding the microstructure of a diffractive optical element will be described later in conjunction with FIG. 5.

It is to be noted that, while the split laser beams 304 are illustrated as a one-dimensional array in FIG. 3, in actual applications, laser beams 304 may be a one-dimensional or two-dimensional array of beams. In addition, the spots can form an array of many possible patterns depending on the periodic microstructure of diffractive optical element 216, as further described in detail in FIG. 6.

In some embodiments, diffractive optical element 216 may be used in combination with a focusing lens in the receiving end of a LiDAR system, e.g., in combination with a receiving lens 218 as illustrated in FIGS. 2-3. If organized this way, the output laser beam array may be converted to an array of focused spots at a certain distance (e.g., at a focal plane) behind the receiving lens. These spots may exhibit an array pattern and an intensity redistribution among the split spots set by the periodic microstructure of diffractive optical element 216, as further described below in FIG. 4.

Figure 4:
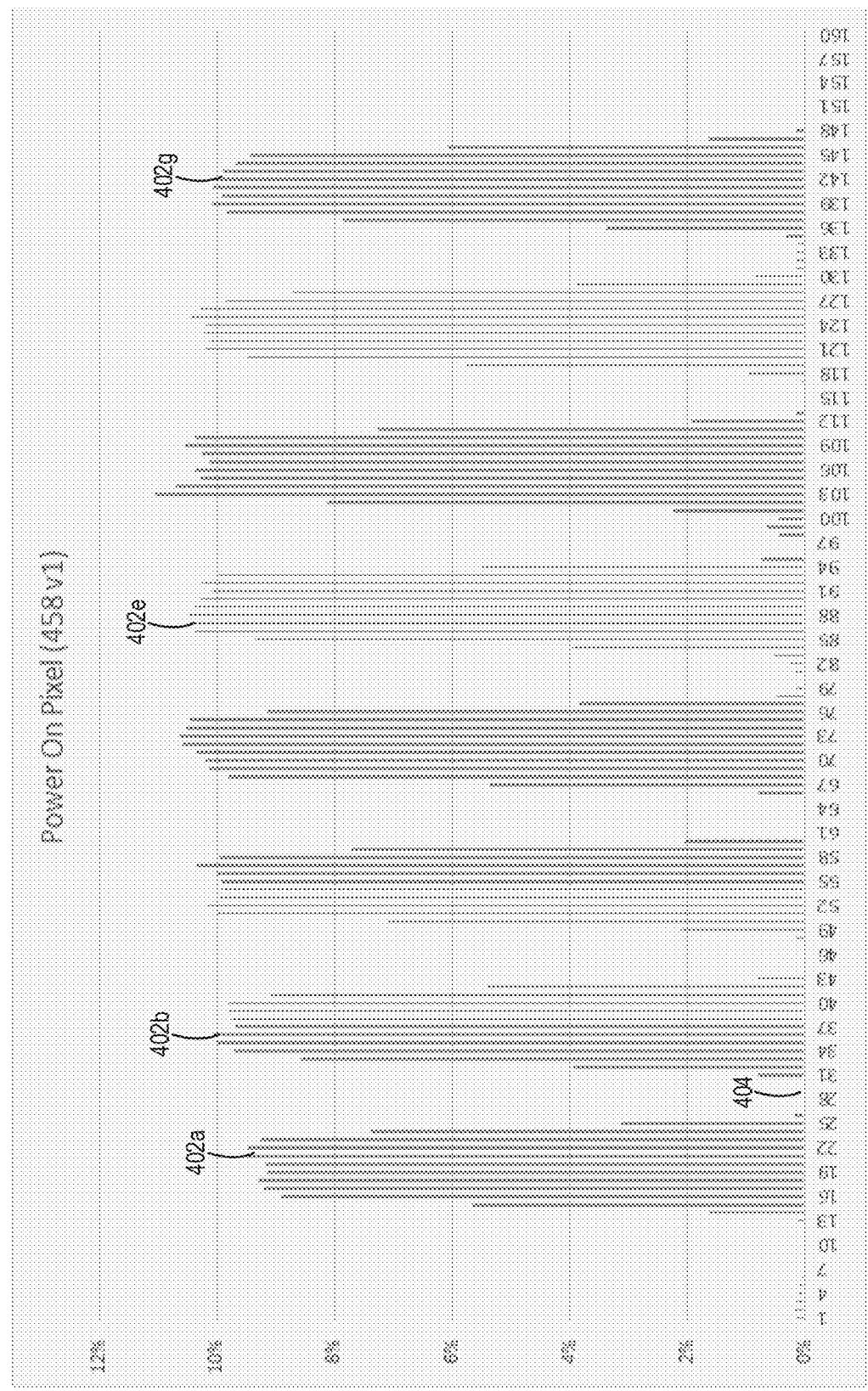
FIG. 4 illustrates an example light intensity profile of multiple spots split from a laser beam returning from an environment, according to embodiments of the disclosure.

FIG. 4 illustrates an example light intensity profile of multiple spots split from a laser beam returning from an environment, according to embodiments of the disclosure. As can be seen, the shaped intensity profile of the laser spots on the focal plane of the receiving lens exhibits a top-hat beam profile or a flat-top beam profile. That is, the light intensity at each spot is nearly uniform over most of the covered area and has sharp edges, which is in contrast to Gaussian beams or normal beams in the existing LiDAR systems, where the intensity smoothly decays from its maximum on the beam axis to zero. In addition, as can be seen from FIG. 4, there is a step energy drop-off between the split spots. For instance, between the two split spots 402a and 402b shown in FIG. 4, there is also a gap 404, in which there is a step energy drop-off or even no energy at all at the gap.

In some embodiments, the width/size of each gap (also referred to as an "interval") between the two split spots may be controlled to match the gaps between sensitive areas (e.g., photosensors) in the photosensor array. As previously described, due to fabrication limitations, there are always gaps between sensitive areas of the sensitive elements of the photosensor array in a LiDAR system. If there is no diffractive optical element, parts of laser beams (e.g., Gaussian laser beams or normal laser beams in the existing LiDAR systems) may be incident on the gaps between sensitive areas in the photosensor array, resulting in an optical loss and thus a distorted image or map. By including a properly designed diffractive optical element, the optical signal or the light intensity falling in the gaps between the sensitive areas of the photosensor array may be minimized or controlled to be zero, thereby improving the efficiency of the photosensor array in photosensing.

As also can be seen from FIG. 4, the intensity of each split spot is close to each other. For instance, the intensity for spot 402a and spot 402g on the edges are close to the intensity for spot 402e located at the center. That is, the intensities of the split spots are more balanced and more evenly distributed between the edges and the center, and thus the optical signal detected by each sensitive element in the photosensor array is more uniform when compared to the optical signal that is in the Gaussian or normal distribution as shown in the existing LiDAR systems. That is, a returning laser beam 302 with a Gaussian or normal intensity distribution 312 may be converted, by diffractive optical element 216, to an array of laser beams 304 with more uniform intensity distribution, e.g., as a series of top-hat beams or flat-top beams 314 that have close intensities, as shown in FIG. 3. Accordingly, the disclosed diffractive optical element may overcome the non-uniformity of the optical signal returning from the environment during an optical sensing process. The benefits and advantages of the disclosed diffractive optical element will become more apparent in view of its structures and functions, as further described below in FIGS. 5-7.

Figure 5:
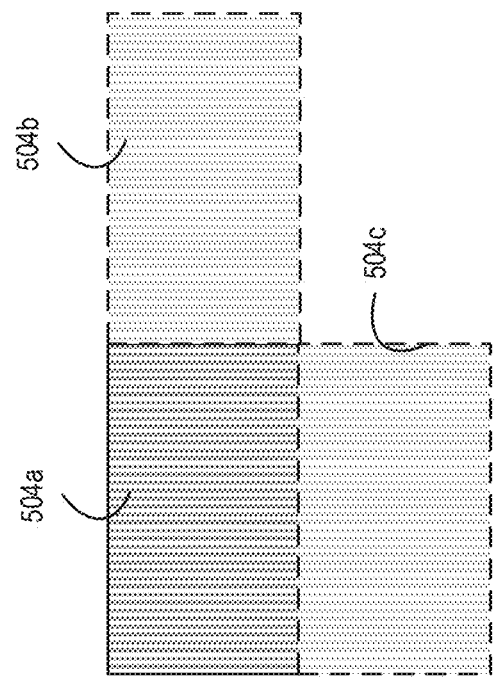
FIG. 5 illustrates a schematic diagram of exemplary diffractive optical elements, according to embodiments of the disclosure.
Figure 5:
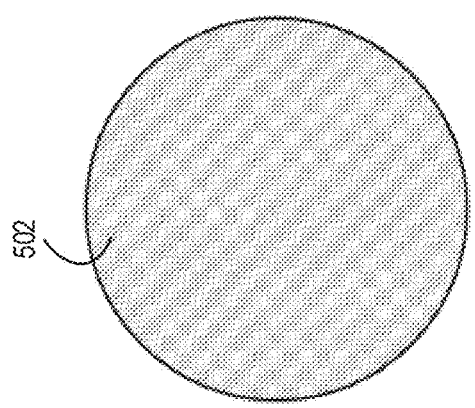

FIG. 5 illustrates a schematic diagram of exemplary diffractive optical elements, according to embodiments of the disclosure. In some embodiments, a diffractive optical element may be a thin phase element that operates by means of interference and diffraction to produce arbitrary distributions of light. The thin phase element may have a periodic grating structure profile. For instance, a diffractive optical element may include a thin structure of rings on its surface with each different ring having a tooth-like profile (not shown in FIG. 5). In addition, a diffractive optical element may be configured to have different shapes and sizes. For instance, as shown in FIG. 5, diffractive optical element 502 may be in a circular shape while diffractive optical element 504a may be in a rectangular shape. Other shapes of diffractive optical elements are also possible. In addition, the microstructure profile of each diffractive optical element may be also different, thereby allowing different patterns of light distribution to be obtained after passing through these diffractive optical elements. That is, different types of diffractive optical elements may utilize different microstructure surface profiles for their optical functions. Through controlling the microstructure profile, light transmitted by a diffractive optical element may be reshaped to almost any desired distribution, by adjusting the diffraction and the subsequent propagation. It is to be noted that a diffractive optical element may only change the shape of the desired intensity pattern, but maintain other parameters of an incident light source (e.g., beam size, divergence, polarization). Due to its design flexibility, a diffractive optical element may achieve optical functions that otherwise cannot be performed without a complicated optical system. Moreover, compared to refractive optical elements, a diffractive optical element is typically much thinner and lighter, making it a better option in LiDAR applications.

In some embodiments, the periodic grating structure profile of a diffractive optical element may be produced using different design approaches. For instance, a binary or analog solution may be applied to generate a grating structure on a diffractive optical element. Between the two solutions, the binary solution may be a useful approach to producing a beam splitter if the desired spot distribution is centrosymmetric. For other non-centrosymmetric spot distribution, an analog, continuous approach may be more proper. For either the binary solution or the analog solution, the surface structure design of a diffractive optical element may require a calculation, given the desired intensity distribution of the laser spots on the focal plane. For instance, an iterative Fourier transform algorithm (IFTA) may be applied to the computer design of the microstructure surface profile of a diffractive optical element. Following the calculated surface structure, a diffractive optical element may be properly manufactured with an expected optical function in light distribution. A manufactured diffractive optical element with the designed surface structure may be then placed in a returning light path of a LiDAR system, to split a returning laser beam into multiple laser beams with a desired pattern.

Figure 6:
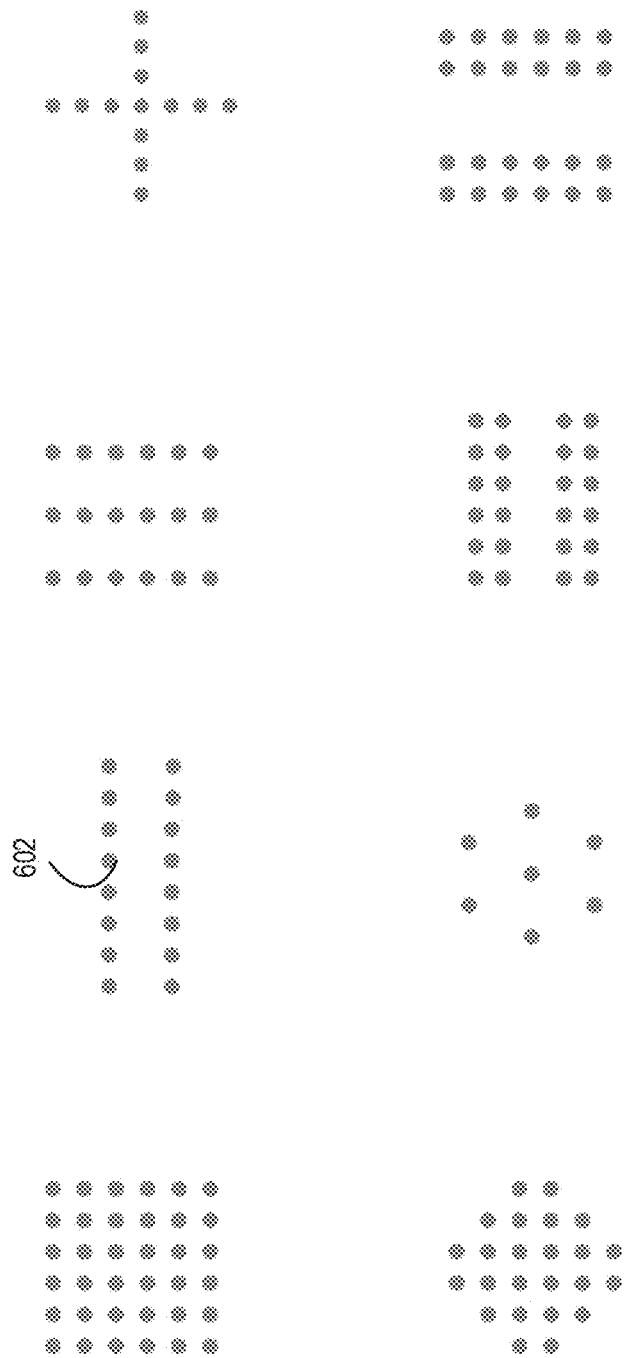
FIG. 6 illustrates a schematic diagram of exemplary patterns of laser beams split by a diffractive optical element, according to embodiments of the disclosure.

FIG. 6 illustrates a schematic diagram of exemplary patterns of split laser beams, according to embodiments of the disclosure. As described above, through the design of the microstructure (e.g., the specific grating structure) on the surface of an optical diffraction element, the output laser beams may conform to any designed light intensity distribution when a specific light (e.g., a returning laser beam) is incident on the designed diffractive optical element. For instance, through the design of the periodic grating structure on the surface of an optical diffraction element, the light output may conform to a specific pattern of an organized photosensor array in a LiDAR system. Various exemplary patterns of light output from designed diffractive optical elements are illustrated in FIG. 6. As can be seen, the light output may include multiple focused spots or laser beams that are organized in a one-dimensional or two-dimensional array. It is to be noted that the arrangement of the focused spots is not limited to arrays in perpendicular x-y lattices as illustrated in the figure. In some embodiments, hexagonal or irregular lattices are also possible. Therefore, a diffractive optical element may help realize many functions and optical operations which are not feasible in the traditional optical systems in LiDAR applications. In addition, due to its flexibility in microstructure design, it can be applied to many different LiDAR systems with different photodetector configurations, even for some irregular photodetector configurations.

As described above, the exemplary patterns illustrated in FIG. 6 may precisely conform to the layout of sensitive elements in a photosensor array of a LiDAR system. For instance, a pattern 602 of split laser beams may conform to a photosensor array that includes an upper part and a lower part, where each part may include eight sensitive elements. As a result, the intensity distribution of the split laser beams is optimized for multiple channel processing, thereby enhancing both efficiency and performance. This makes the high-precision diffractive optical elements ideal for LiDAR applications, e.g., for sub pixelization and increased resolution that requires a better intensity distribution. It is to be noted that the patterns illustrated in FIG. 6 are merely for illustrative purposes, but not for limitation. Other patterns of split laser beams or focused spots are also possible through the microstructure surface design of a diffractive optical element.

It is to be noted that, while FIGS. 3-6 illustrate an exemplary splitting of a single laser beam by a diffractive optical element, the disclosed diffractive optical element is not limited to a splitting of a single laser beam. In some embodiments, an optical diffractive element may simultaneously split multiple laser beams at the same time. This is especially useful for a LiDAR system that includes multiple simultaneous lasers and multiple simultaneous sensitive elements for advanced optical sensing or detection. To enable splitting multiple laser beams, a diffractive optical element may expand the size designed for splitting a single laser beam. For instance, for diffractive optical element 504a shown in FIG. 5, it may be horizontally expanded to include one or more additional portions 504b to cover more laser beams if the incident laser beams are horizontally aligned, or may be vertically expanded to include one or more additional portions 504c to cover more laser beams if the incident laser beams are vertically aligned. Similarly, for diffractive optical element 502 shown in FIG. 5, it may be vertically or horizontally expanded to become an ellipse or by including another circle-shaped part(s) to cover more incident laser beams. That is, by expanding the size without changing the microstructure profile of a diffractive optical element, the disclosed diffractive optical element may allow multiple laser beams to be split simultaneously. Since the microstructure of the diffractive optical element remains unchanged, the array pattern of the split laser beams from each laser beam incident on the diffractive optical element may remain the same, as described in one application scenario below in FIG. 7.

Figure 7:
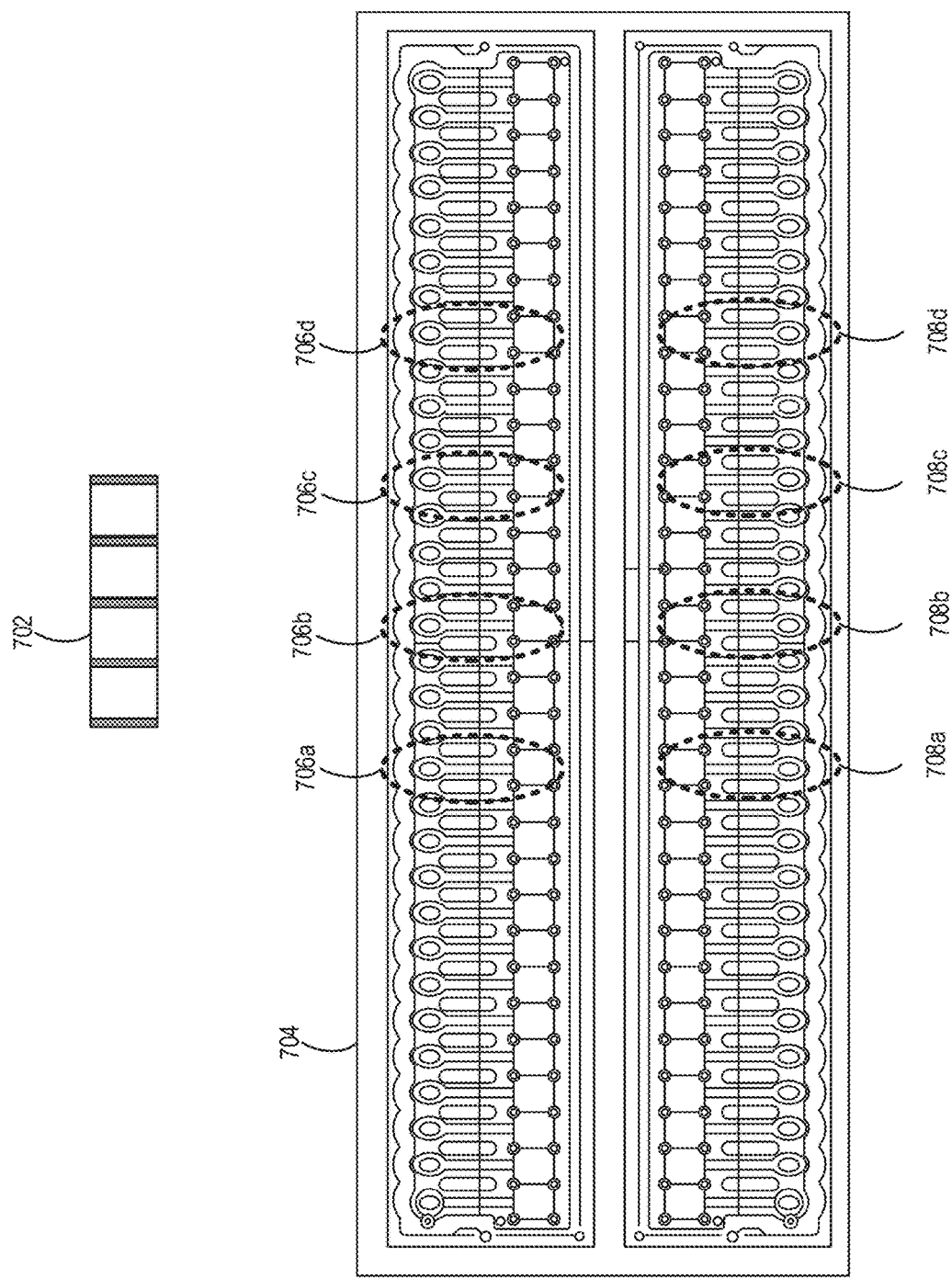
FIG. 7 illustrates a schematic diagram of an exemplary splitting of multiple laser beams, according to embodiments of the disclosure.

FIG. 7 illustrates a schematic diagram of an exemplary splitting of multiple laser beams, according to embodiments of the disclosure. As illustrated, an exemplary LiDAR system may include a multi-channel laser bar(s) 702 and a two-dimensional photosensor array 704. Multi-channel laser bar 702 may include multiple laser emitters (e.g., four laser emitters) that emit multiple laser beams (e.g., four laser beams) simultaneously, or sequentially in some embodiments. Two-dimensional photosensor array 704 may include an upper photosensor array and a lower photosensor array that each includes multiple sensitive elements. To allow a simultaneous splitting of multiple laser beams, a diffractive optical element may have an expanded size as described above. After splitting by the diffractive optical element, each returning laser beam corresponding to a laser emitter in multi-channel laser bar 702 may be split into two laser beams, as indicated by circles 706a-706d, where each circle includes two sensitive elements that are responsible for receiving the two focused spots from the split two laser beams corresponding to each laser emitter in the multi-channel laser bar 702. Therefore, for four laser beams emitted by multi-channel laser bar 702, there may be eight sensitive elements that detect eight laser beams split by the diffractive optical element. That is, the diffractive optical element may split each of the returning laser beams according to a 1:2 split ratio. For the lower part included in the two-dimensional photosensor array 704, the same diffractive optical element may also split each corresponding laser beam into two laser spots for detection by two sensitive elements, as indicated by a circle 708a, 708b, 708c, or 708d.

In some embodiments, instead of being detected by one sensitive element in a photosensor array, a split spot may be detected by two or more sensitive elements in the photosensor array. For instance, for four returning laser beams corresponding to multi-channel laser bar 702, each split laser spot may be detected by two sensitive elements. For instance, for a returning laser beam, it may be detected by two sensitive elements included in a circle 706a, 706b, 706c, 706d, 708a, 708b, 708c, or 708d in FIG. 7. In one example, circles 706a and 708a may be responsible for detection of two laser spots split from a returning laser beam, circles 706b and 708b may be responsible for detection of two laser spots split from another returning laser beam, and so on. It is to be noted that the diffractive optical element used here may be different from the diffractive optical element described earlier since a different split pattern and light distribution is achieved here. As can be seen, by increasing the number of sensitive elements used in the detection array, it may allow a further improvement in imaging resolution for an already advanced LiDAR system that includes multiple laser emitters and multiple photosensors. The improved performance of a LiDAR system containing a diffractive optical element will be further illustrated in FIG. 8 in light of an exemplary application of such a LiDAR system in optical sensing.

Figure 8:
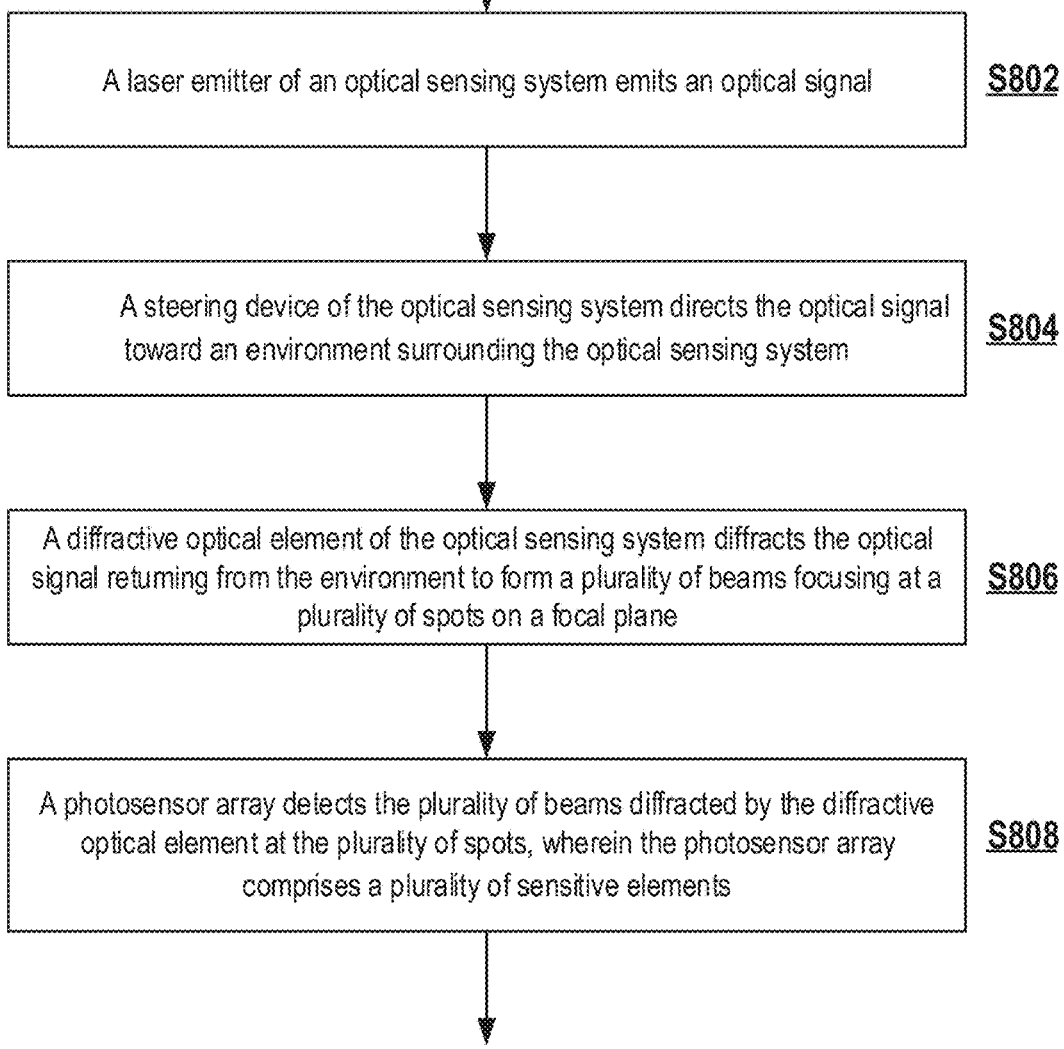
FIG. 8 is a flow chart of an exemplary optical sensing method performed by a LiDAR system containing a diffractive optical element, according to embodiments of the disclosure.

FIG. 8 is a flow chart of an exemplary optical sensing method 800 performed by a LiDAR system containing a diffractive optical element at a receiving end, according to embodiments of the disclosure. In some embodiments, method 800 may be performed by various components of LiDAR system 102, e.g., transmitter 202, receiver 204 containing a diffractive optical element 216, and/or controller 206. In some embodiments, method 800 may include steps S802-S808. It is to be appreciated that some of the steps may be optional. Further, some of the steps may be performed simultaneously, or in a different order than that shown in FIG. 8.

In step S802, an optical source (e.g., laser emitter 208) inside a transmitter of an optical sensing system (e.g., transmitter 202 of LiDAR system 102) may emit an optical signal for optical sensing of the environment. Here, the optical signal emitted by the optical source may have a predetermined beam size and intensity. In some embodiments, the optical source may include a single laser emitter, and thus a single laser beam is emitted by the optical source at a timepoint. In some alternative embodiments, the optical source may be a multi-channel laser bar that includes multiple simultaneous laser emitters that emit multiple laser beams simultaneously. In some embodiments, an emitted laser beam may be nonuniform due to certain instrumental design and environmental factors.

In step S804, a steering device of the optical sensing system (e.g., scanner 212 in transmitter 202 of LiDAR system 102) may steer the emitted laser beam(s) toward the environment surrounding the optical sensing system. The steering device may steer the emitted laser beam(s) according to a predefined pattern, so that different parts of the environment may be scanned over a short period of time. For instance, the emitted laser beam(s) may be directed toward an object (e.g., one or more objects 214) in the environment. The object(s) in the environment may then reflect at least a portion of the optical signal toward the LiDAR system containing a diffractive optical element. For instance, the object(s) may reflect one laser beam if the laser source includes one laser emitter, or multiple laser beams if the laser source includes multiple laser emitters. As previously described, the returning laser beam(s) may be non-uniform laser beams due to the Lambertian effect and/or due to the emitted laser beam(s) itself. For instance, the intensity of the returning laser beam(s) may have a Gaussian intensity distribution or normal intensity distribution.

In step S806, a diffractive optical element of the LiDAR system may split a returning laser beam into multiple laser beams. The diffractive optical element may have a certain microstructure that is configured to split an incident laser beam into multiple laser beams that have predefined intervals, intensity ratios, and a symmetrical distribution. The alignment of multiple split laser beams may match the alignment of the sensitive elements included in a photosensor array in the LiDAR system, so that each split laser beam may be detected by one or more corresponding sensitive elements. In addition, the gaps between the individual split laser beams may also match the gaps that are present between the sensitive areas of the sensitive elements due to the fabrication limitation. In some embodiments, a receiving lens may be placed right after the diffractive optical element, so that each split laser beam is focused onto a focal plane as a spot. In some embodiments, the sensitive elements included in the photosensor array may be disposed at the focal plane of the receiving lens to detect each focused spot corresponding to a split laser beam.

In step S808, a receiver (e.g., receiver 204) of the optical sensing system may receive the optical signal split by the diffractive optical element. As described above, the receiver may include a photosensor array that detects the split laser beams. This allows a sub-pixelization to be achieved. If there is no diffractive optical element in the receiving end (or receiver), a returning laser beam may have a non-uniform intensity distribution due to the Lambertian effect and/or non-uniformity of an emitted laser beam, which may result in a pixel loss and thus distorted imaging. However, due to the introduction of a diffractive optical element in the receiving end of the optical sensing system, the light intensity received by each sensitive element on the photosensor array may be more uniform. For instance, the intensity of each split laser beam may be close to each other among the split laser beams, but does not have a Gaussian or normal distribution like other existing LiDAR systems do. In addition, due to the intervals between the split laser beams, the focused spot of each split laser beam may be controlled to fall within a sensitive area of a sensitive element, but not in the non-sensitive gaps between the sensitive areas of the photosensor array. Therefore, the inclusion of a diffractive optical element in the receiving end of an optical sensing system may prevent optical loss in certain channels of a photosensor array, thereby improving the accuracy and efficiency of the optical sensing system in optical sensing and detection.

Although the disclosure is made using a LiDAR system as an example, the disclosed embodiments may be adapted and implemented to other types of optical sensing systems that use receivers to receive optical signals not limited to laser beams. For example, the embodiments may be readily adapted for optical imaging systems or radar detection systems that use electromagnetic waves to scan objects.

Another aspect of the disclosure is directed to a non-transitory computer-readable medium storing instructions which, when executed, cause one or more processors to perform the methods, as discussed above. The computer-readable medium may include volatile or non-volatile, magnetic, semiconductor-based, tape-based, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

What is claimed is:

1. An optical sensing system, comprising:
  a laser emitter, configured to emit an optical signal;

a steering device, configured to direct the emitted optical signal toward an environment surrounding the optical sensing system;
a diffractive optical element, configured to diffract the optical signal returning from the environment to form a plurality of beams focusing at a plurality of spots on a focal plane, wherein the optical signal returning from the environment has a light intensity profile of one of a Gaussian distribution or a normal distribution and each of the plurality of beams has a top-hat intensity profile comprising sharp edges and a step energy drop-off between the plurality of spots; and
a photosensor array placed at the focal plane, configured to detect the plurality of beams diffracted by the diffractive optical element at the plurality of spots, wherein the photosensor array comprises a plurality of sensitive elements.

2. The optical sensing system of claim 1, wherein the diffractive optical element comprises a periodic grating structure profile to diffract and propagate the plurality of beams toward the plurality of spots on the focal plane.

3. The optical sensing system of claim 2, wherein the periodic grating structure profile of the diffractive optical element comprises a thin structure of rings on a surface with each different ring having a tooth-like profile.

4. The optical sensing system of claim 1, wherein sensitive areas of two sensitive elements of the photosensor array corresponding to two consecutive spots on the focal plane are separated by a non-sensitive area in between.

5. The optical sensing system of claim 1, further comprising a receiving lens configured to focus the plurality of beams onto the plurality of sensitive elements of the photosensor array corresponding to the plurality of spots on the focal plane.

6. The optical sensing system of claim 2, wherein the plurality of beams diffracted by the diffractive optical element have predefined intervals, intensity ratios, and a symmetrical distribution.

7. The optical sensing system of claim 6, wherein the predefined intervals, intensity ratios, and symmetrical distribution of the plurality of beams are determined by the periodic grating structure profile of the diffractive optical element.

8. The optical sensing system of claim 1, wherein each split laser beam is detected by at least two consecutive sensitive elements of the photodetector array.

9. The optical sensing system of claim 1, wherein the laser emitter comprises a multi-channel laser bar that includes a plurality of laser emitters configured to emit a plurality of optical signals simultaneously.

10. The optical sensing system of claim 9, wherein the diffractive optical element is configured to diffract the plurality of optical signals returning from the environment simultaneously.

11. An optical sensing method, comprising:
emitting, by a laser emitter of an optical sensing system, an optical signal toward an environment surrounding the optical sensing system;
directing, by a steering device of the optical sensing system, the emitted optical signal toward the environment surrounding the optical sensing system;
diffracting, by a diffractive optical element of the optical sensing system, the optical signal returning from the environment to form a plurality of beams focusing at a plurality of spots on a focal plane, wherein the optical signal returning from the environment has a light intensity profile of one of a Gaussian distribution or a normal distribution and each of the plurality of beams has a top-hat intensity profile comprising sharp edges and a step energy drop-off between the plurality of spots; and
detecting, by a photosensor array of the optical sensing system, the plurality of beams diffracted by the diffractive optical element at the plurality of spots, wherein the photosensor array comprises a plurality of sensitive elements.

12. The optical sensing method of claim 11, wherein the diffractive optical element comprises a periodic grating structure profile to diffract and propagate the plurality of beams toward the plurality of spots on the focal plane.

13. The optical sensing method of claim 12, wherein the periodic grating structure profile of the diffractive optical element comprises a thin structure of rings on a surface with each different ring having a tooth-like profile.

14. The optical sensing method of claim 11, wherein sensitive areas of two sensitive elements of the photosensor array corresponding to two consecutive spots on the focal plane are separated by a non-sensitive area in between.

15. The optical sensing method of claim 11, further comprising:
focusing, by a receiving lens of the optical sensing system, the plurality of beams onto the plurality of sensitive elements of the photosensor array corresponding to the plurality of spots on the focal plane.

16. A receiver of an optical sensing system, comprising:
a diffractive optical element, configured to diffract an optical signal returning from an environment surrounding the optical sensing system, to form a plurality of beams focusing at a plurality of spots on a focal plane, wherein the optical signal is emitted and directed toward the environment by a transmitter of the optical sensing system, the optical signal returning from the environment has a light intensity profile of one of a Gaussian distribution or a normal distribution, and each of the plurality of beams has a top-hat intensity profile comprising sharp edges and a step energy drop-off between the plurality of spots;
a receiving lens, configured to focus the plurality of beams at the plurality of spots on the focal plane; and
a photosensor array, configured to detect the plurality of beams diffracted by the diffractive optical element at the plurality of spots, wherein the photosensor array comprises a plurality of sensitive elements.

* * * * *